(12) United States Patent
Kageyama et al.

(10) Patent No.: US 6,934,058 B2
(45) Date of Patent: Aug. 23, 2005

(54) IMAGE READING APPARATUS AND METHOD WITH READING SUSPENSION AND RESUMPTION BASED ON MEMORY CHARACTERISTICS

(75) Inventors: Tomoaki Kageyama, Saitama (JP); Kazuhide Sugiyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 09/884,614

(22) Filed: Jun. 19, 2001

(65) Prior Publication Data

US 2001/0053002 A1 Dec. 20, 2001

(30) Foreign Application Priority Data

Jun. 20, 2000 (JP) .................................. 2000-184992
Dec. 27, 2000 (JP) .................................. 2000-399043

(51) Int. Cl.[7] .................................................. H04N 1/04
(52) U.S. Cl. ...................... 358/497; 358/1.14; 358/400; 250/208.1; 250/234
(58) Field of Search ............................... 358/400, 497, 358/475, 474, 487, 406, 461, 471, 449, 1.14; 250/208.1, 559, 234

(56) References Cited

U.S. PATENT DOCUMENTS

| | | | | |
|---|---|---|---|---|
| 4,958,298 A | * | 9/1990 | Okamoto | 358/1.14 |
| 5,721,423 A | * | 2/1998 | Hamamoto | 250/208.1 |
| 6,194,712 B1 | * | 2/2001 | Suemoto et al. | 250/234 |
| 6,587,226 B2 | * | 7/2003 | Bannai | 358/400 |
| 6,674,553 B1 | * | 1/2004 | Ito | 358/497 |

* cited by examiner

Primary Examiner—Edward Coles
Assistant Examiner—Heather D. Gibbs
(74) Attorney, Agent, or Firm—Morgan & Finnegan LLP

(57) ABSTRACT

In an image reading apparatus which scans an image while displacing the relative position between the image on a predetermined medium and an image sensor, and sequentially transmits the read image data to an external device, when image reading operation of an image reading unit suspends, the relative position between the image and the image sensor is displaced to a predetermined position before the suspended position of the image reading operation, and reading operation restarts from the displaced position.

35 Claims, 9 Drawing Sheets

IMAGE READING APPARATUS AND METHOD WITH READING SUSPENSION AND RESUMPTION BASED ON MEMORY CHARACTERISTICS

FIELD OF THE INVENTION

The present invention relates to an image reading apparatus and method for outputting image data read from a medium such as paper or a microfilm to an external device such as a personal computer or printer, and a computer-readable storage medium.

BACKGROUND OF THE INVENTION

In an image reading apparatus such as a microfilm reader connected to an external device such as a personal computer, read image data are temporarily stored in the internal buffer memory of the image reading apparatus, sequentially transferred to the external device such as a personal computer via an interconnection, and stored or displayed.

In the prior art, the buffer memory must have a capacity of at least one frame in order to output image data to an external device such as a personal computer while scanning the image, or a capacity of one frame or more in order to successively scan a plurality of images in consideration of a possibility that image data which has not been transferred remains in the buffer memory.

As the CPU speeds of recent personal computers or the like increase, image data can be transmitted to an external device such as a personal computer without any buffer memory while the image is scanned. The same effects can also be obtained even if the buffer memory does not have a sufficient capacity in an arrangement in which image data are temporarily stored in the internal buffer memory of an image reading apparatus and sequentially output from the buffer memory to an external device such as a personal computer.

While an image is scanned, the image data are sequentially transmitted to an external device such as a personal computer. This can shorten the time taken from the start of scan to the end of image data transfer, can realize successive scan, and can reduce the cost.

However, the data reception speed of an external device such as a personal computer may decrease owing to internal processing of the external device or processing of another device connected to the external device, and may become lower than the image reading speed of the image reading apparatus. In this case, any measure must be taken when the capacity of the buffer memory is insufficient.

As a measure, an image reading apparatus constituted to move a scan unit such as a general flat bed scanner stops movement of the scan unit to temporarily stop scan, waits until data are satisfactorily transferred from the image reading apparatus, and then restarts scan from the same position. Alternatively, the scan unit is moved at a low speed or intermittently moved to make the image data transmission speed catch up with the data reception speed. A sheet through scanner also obtains the same effects by controlling the sheet convey speed.

If this operation is done in an image reading apparatus such as a microfilm reader having an enlargement/projection system, vibrations generated by accelerating/decelerating movement of the scan unit transmit to an optical system and typically generate an image distortion.

That is, the moving speed of the scan unit is controlled by controlling the rotational speed of the motor. The moving speed of the scan unit varies due to variations in the physical inertia of the motor and belt in accelerating/decelerating the motor. As a result, a read image distorts. As for stopping of rotation of the motor, an image may distort due to the same cause upon accelerating the motor at the restart of movement.

If the motor vibrates upon changes in the rotational speed of the motor or variations in load on the motor, the vibrations are transmitted to the optical system to distort a display image and resultantly distort a scanned image.

SUMMARY OF THE INVENTION

The present invention has been made in consideration of the above situation, and has as its object to obtain an undistorted image by scan when image reading temporarily suspends and restarts.

According to the present invention, the foregoing object is attained by providing an image reading apparatus comprising: an image reading unit for scanning and reading an image on a predetermined medium; transmission means for sequentially transmitting image data read by the image reading unit to an external device; a driver for displacing a relative position between the image and the image reading unit; and a controller for, when image reading operation of the image reading unit suspends, displacing the relative position between the image and the image reading unit by the driver to a predetermined position before the suspended position of the image reading operation, and restarting reading operation from the predetermined position.

According to the present invention, the foregoing object is also attained by providing an image reading method of scanning and reading the image by displacing a relative position between an image on a predetermined medium and an image reading unit by a driver, and sequentially transmitting image data read by the image reading unit to an external device, comprising: the displacement step of, when image reading operation of the image reading unit suspends, displacing the relative position between the image and the image reading unit to a predetermined position before the suspended position of the image reading operation by the driver; and the reading restart step of restarting reading operation from the predetermined position displaced in the displacement step.

Further, according to another aspect of the present invention, the apparatus further comprises area designation means for designating a desired image area on the predetermined medium, wherein the image reading unit scans and reads the image area of the predetermined medium designated by the area designation means.

In the above case, the predetermined position is set to a position before an image scan start position of the desired image area designated by the area designation means in consideration of a distance by which acceleration of the driver ends and a moving speed becomes constant until the relative position between the image and the image reading unit reaches the image scan start position of the desired image area.

Further, the method further comprises the designation step of designating desired image area of the predetermined medium, wherein the designated desired image area is read by the image reading unit, and the predetermined position is set to a position before an image scan start position of the desired image area designated in the designation step in consideration of a distance by which acceleration of the driver ends and a moving speed becomes constant until the relative position between the image and the image reading unit reaches the image scan start position of the desired image area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 3:
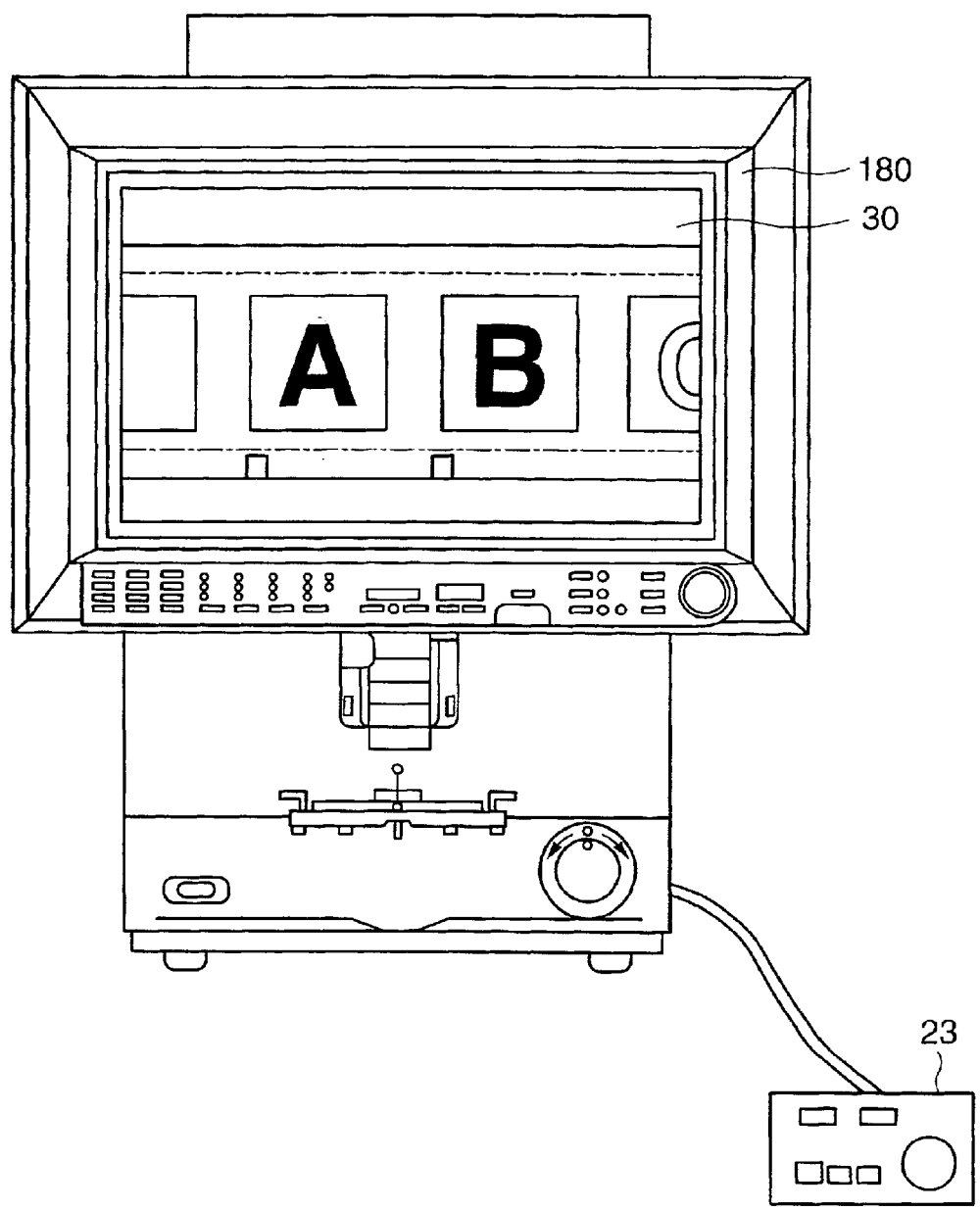
FIG. 3 is a view showing the microfilm reader according to the first embodiment of the present invention.
Figure 4:
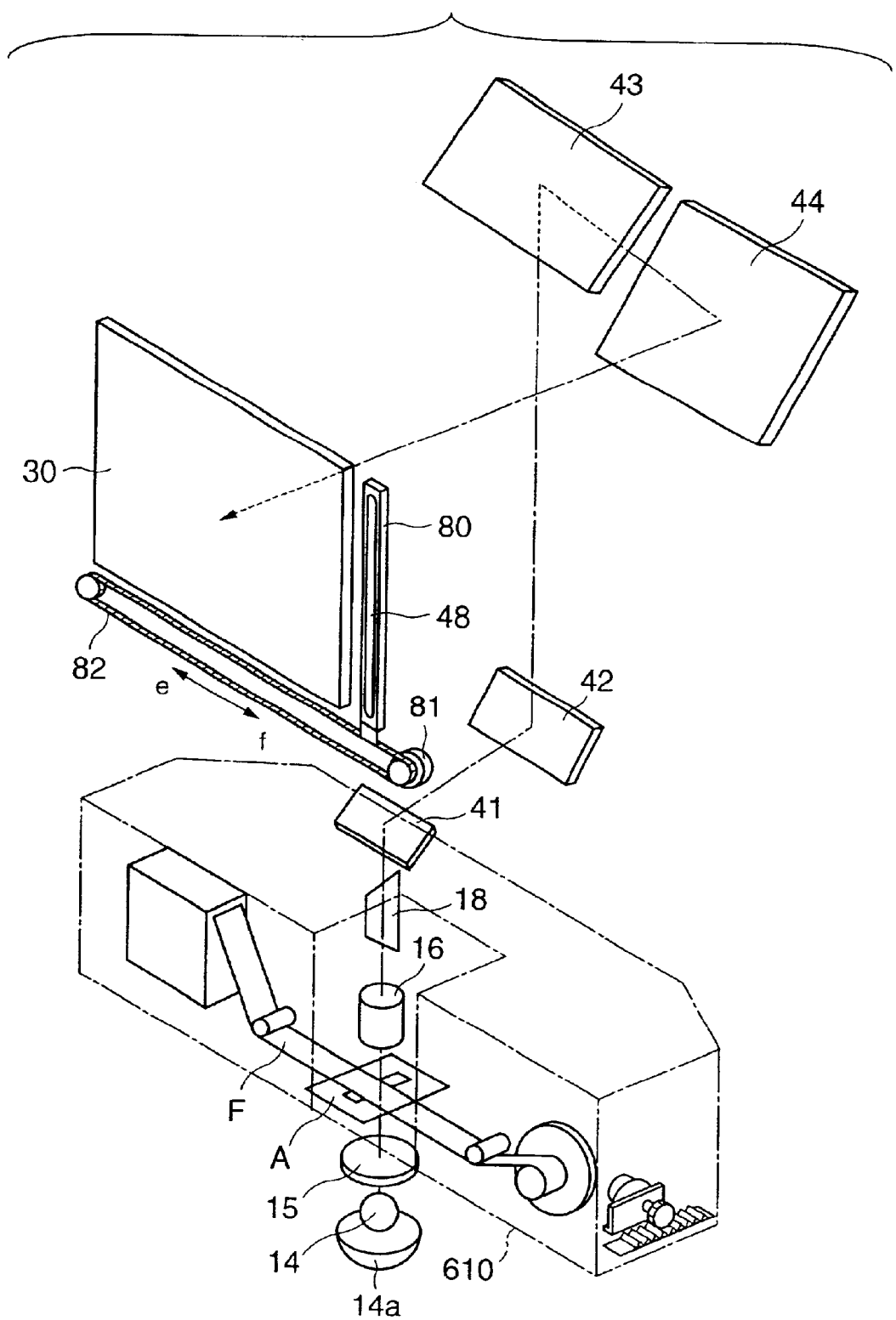
FIG. 4 is a view showing the structure of the microfilm reader according to the first embodiment of the present invention.

A microfilm reader will be described as the first embodiment. The detailed arrangement of the microfilm reader will be explained with reference to FIGS. 3 and 4. In FIG. 4, a film carrier 610 conveys a roll microfilm F so as to position a desired image frame to a projection glass A at a projection position.

The target image frame of the roll microfilm F conveyed to the projection glass A is illuminated from the lower surface by an illumination system including a light source lamp 14, spherical mirror 14a, and condenser lens 15 located below the projection glass A. The illumination light having passed through the target image frame is projected into an image enlarged at a predetermined magnification on the back surface of a reader screen (light diffusion plate) 30 via the reading portion optical system including a projection lens 16, prism lens 18, and fixed mirrors 41 to 44. As shown in FIG. 3, the image (microimage) of the target image frame can be monitored as an enlarged image from the front surface of the reader screen 30.

A scan unit 80 having an image sensor 48 is coupled to a belt 82. The belt 82 moves in an e-f direction in FIG. 4 along with driving of a motor 81. In projection operation (reader mode) of the target image frame on the reader screen 30, the scan unit 80 is held by the belt 82 and motor 81 at a position (home position) retracted from the optical path extending to the reader screen 30, as shown in FIG. 4.

In an operation mode (scan mode) in which the microimage enlarged and projected on the reader screen 30 is scanned, the motor 81 is driven by a scan instruction from an operation unit 23 (see FIG. 3), and the belt 82 connected to the motor 81 moves in the e-f direction in FIG. 4. Thereby the scan unit 80 moves in the e-f direction, enters the optical path, and scans image light.

Figure 1:
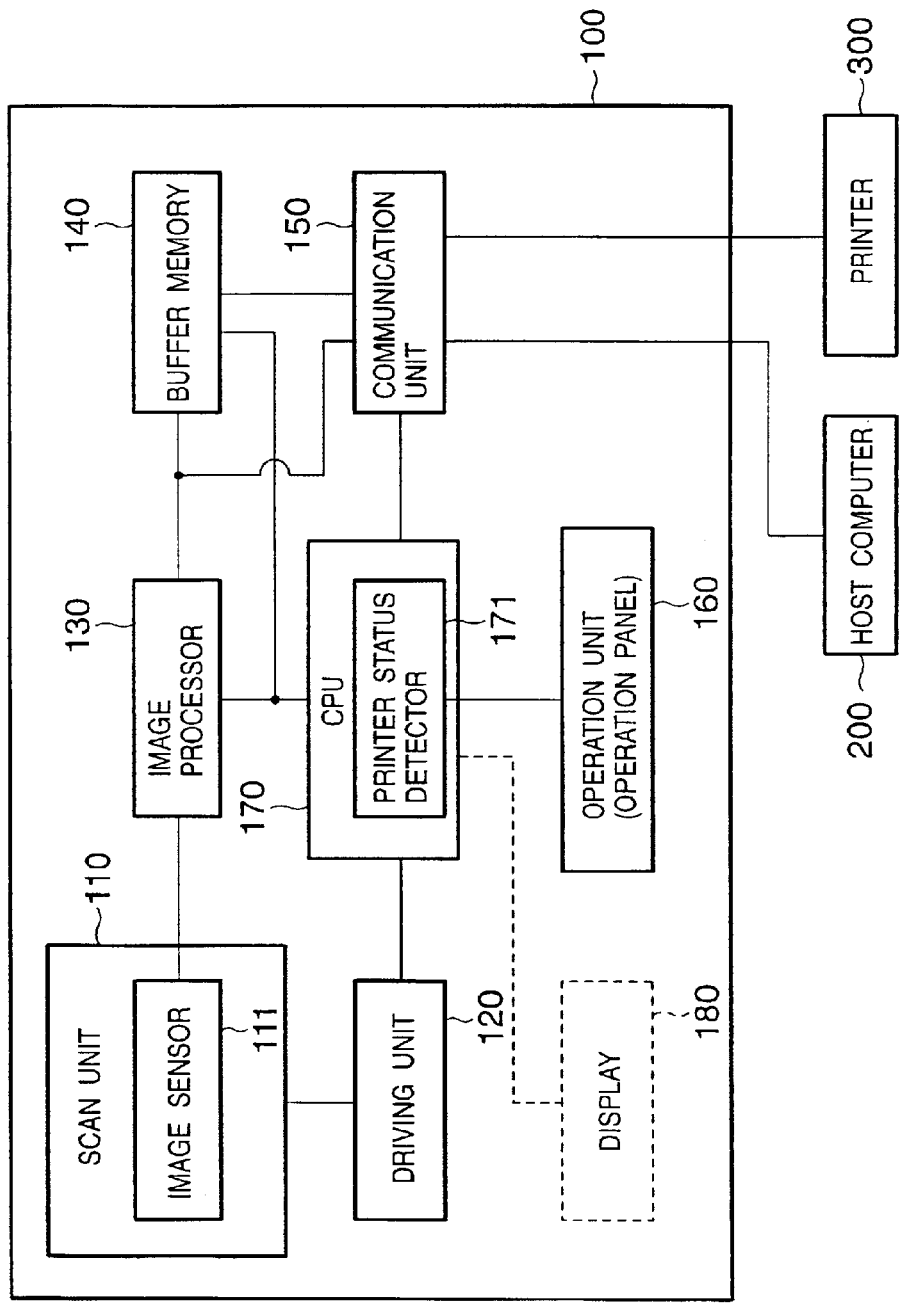
FIG. 1 is a block diagram showing a circuit arrangement of a microfilm reader according to a first embodiment of the present invention.

FIG. 1 shows the circuit arrangement of a microfilm reader 100 according to the first embodiment. In FIG. 1, reference numeral 110 denotes a scan unit which scans a set original by using an image sensor 111 to acquire the image signal of the original. The scan unit 110 equipped with the image sensor 111 corresponds to the scan unit 80 equipped with the image sensor 48 in the detailed arrangement shown in FIG. 4.

Reference numeral 120 denotes a driving unit for driving the scan unit 110. The driving unit 120 corresponds to the motor 81 for driving the scan unit 80 in the detailed arrangement shown in FIG. 4.

Reference numeral 130 denotes an image processor for performing, for the image signal obtained by the image sensor 111 of the scan unit 110, A/D conversion processing of converting an analog signal into a digital signal and shading correction of correcting the light quantity irregularity of a light source and the output irregularity of the image sensor 111.

Reference numeral 140 denotes a buffer memory for storing image data having undergone image processing by the image processor 130; and 150, a communication unit which communicates with a host computer 200 and printer 300 as external devices connectable to the microfilm reader 100 and sends image data to them.

Reference numeral 160 denotes an operation unit (operation panel) for various image reading settings.

Reference numeral 170 denotes a CPU-which controls the whole operation of the microfilm reader 100 and has a printer status detector 171. In the first embodiment, the CPU 170 implements functions such as monitoring and control functions in the present invention.

Reference numeral 180 denotes a display which displays an enlarged microimage projected on the reader screen 30, as shown in FIG. 3.

This microfilm reader 100 can operate on the basis of both an instruction from the operation unit 160 and an instruction from the host computer 200.

For example, if the microfilm reader 100 receives a scan instruction from the host computer 200 or operation unit 160, it is set in the scan mode, and the driving unit 120 moves the scan unit 110 from the home position. In the detailed arrangement shown in FIG. 4, the motor 81 is driven, and the scan unit 80 moves in the e-f direction in FIG. 4 to scan image light. Note that a distance enough to make the moving speed of the scan unit 110 (80) constant is ensured between the home position and the image reading start position.

After image reading starts, the image sensor 111 outputs an analog signal of a 1-line image to the image processor 130. The image processor 130 converts (A/D-converts) the input analog signal into a digital signal, and performs image processing such as shading correction.

The image data processed by the image processor 130 are temporarily stored in the buffer memory 140 and input to the communication unit 150, or directly input to the communication unit 150 without the mediacy of the buffer memory 140, and sequentially transmitted to the host computer 200 or the like.

The microfilm reader 100 and host computer 200 may be connected by a SCSI, serial communication, or the like. In general, an image reading apparatus receives an REQ signal from the host computer 200 in response to an ACK signal from the image reading apparatus, and sends data. When the host computer 200 executes processing other than data reception (e.g., processing of another device connected by a SCSI), no REQ signal is sent back from the host computer 200, or the time until an REQ signal is sent back is long. The image reading apparatus can measure the time to detect the data reception state of the host computer 200.

In this manner, the microfilm reader 100 monitors the data reception state of the host computer 200, and if determining that the data reception speed of the host computer 200 becomes lower than the image data transmission speed of the communication unit 150, stops movement of the scan unit 110 (80), returns the scan unit 110 (80) to the home position, waits until the data reception speed of the host computer 200 recovers, and then restarts scan.

Figure 2:
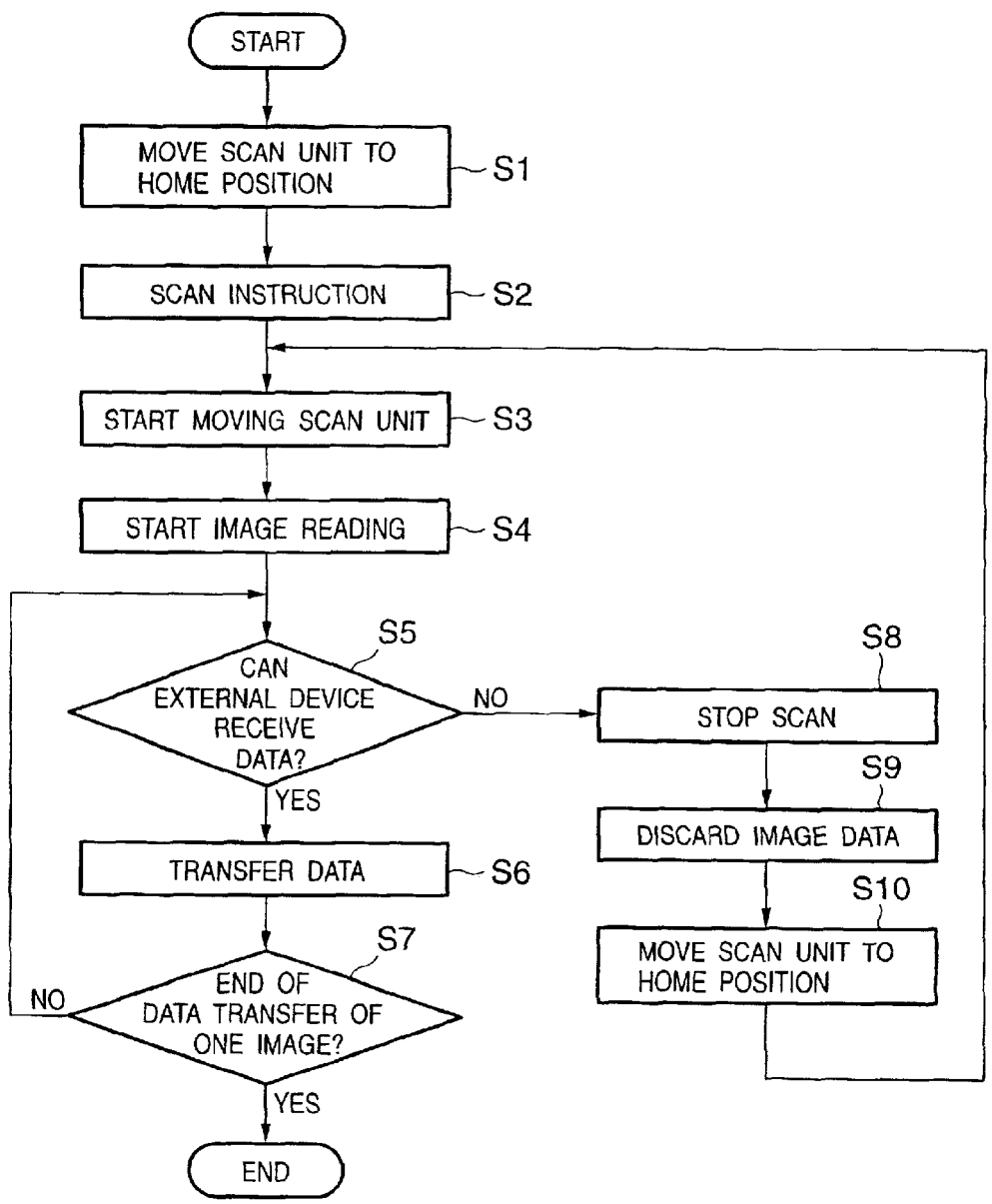
FIG. 2 is a flow chart showing processing operation in the microfilm reader according to the first embodiment of the present invention.

FIG. 2 is a flow chart showing processing operation in the image reading apparatus (microfilm reader 100) of the first embodiment. After the microfilm reader 100 is turned on or reading of a previous image ends, the microfilm reader 100 returns the scan unit 110 to the home position (step S1).

If the microfilm reader 100 receives a scan instruction from the operation unit 160 or host computer 200 (step S2), it is set in the scan mode to start moving the scan unit 110 (80) (step S3). As described above, the distance enough to complete acceleration of the scan unit 110 (80) and make the moving speed constant is ensured between the home position and the image reading start position. The scan unit 110 (80) comes to the leading edge of an image, and then image reading starts (step S4).

The microfilm reader 100 checks whether the host computer 200 as an external device at an image data transfer destination can receive transferred data (step S5). As described above, the image reading apparatus can determine the data reception state of the host computer 200 by measuring the time until the host computer 200 sends back an REQ signal.

If the image reading apparatus determines in step S5 that the host computer 200 can receive data, it shifts to step S6 and transfers the read image data to the host computer 200. At this time, while reading the image, the microfilm reader 100 transfers the image data to the host computer 200, ending scan within a shorter time. The image data may be transferred by one line, several lines, or several pixels of an image. This operation continues until data of one image are transferred (step S7).

If NO in step S5, the microfilm reader 100 shifts to step S8 and stops scan. All the image data stored in the buffer memory 140 of the microfilm reader 100 are discarded (step S9). In step S9, the microfilm reader 100 may notify the host computer 200 of the suspension and instruct it to discard image data transferred to the host computer 200.

Note that the microfilm reader 100 determines NO in step S5 when the data reception state of the host computer 200 influences the image reading speed of the scan unit 110 (80) and scan cannot be done at a predetermined speed, except when, for example, the buffer memory 140 has a sufficient margin and scan can be done at a predetermined speed by temporarily storing the scanned image and transferring the image data from the buffer memory 140 to the host computer 200 even if the data reception speed of the host computer 200 is lower than the image data transmission speed.

If the image data is discarded in step S9, the process advances to step S10, returns the scan unit 110 to the home position, and restarts image reading from the beginning. At this time, the microfilm reader 100 may wait for the end of processing in the host computer 200. The microfilm reader 100 may notify the external device by an ACK signal or the like that image reading can restart.

The position to which the scan unit 110 (80) returns may not be the home position. This position is not limited to the home position as far as acceleration of the scan unit 110 (80) ends and the scan unit 110 (80) can be moved at a predetermined speed when it comes to the leading edge of an image.

In the above-described embodiment, the microfilm reader 100 monitors the data reception state of the host computer 200, and if determining that the data reception speed of the host computer 200 becomes lower than the image data transmission speed, stops the scan unit 110 (80), returns it to the home position, and restarts image reading from the beginning. This can prevent any image distortion.

More specifically, the restart of scan from the same position after transference of sufficient data from the microfilm reader 100 need not be performed, the moving speed of the scan unit 110 (80) need not be decreased or the scan unit 110 (80) need not be intermittently moved to make the data reception speed catch up with the moving speed. Similarly, these control operations need not be performed even when image data are temporarily stored in the buffer memory and sequentially output from the buffer memory to the external device. Movement of the scan unit 110 (80) need not be controlled by controlling rotation of the motor 81. This embodiment can prevent backlash between the motor 81 and the belt 82 upon accelerating/decelerating the motor 81, vibrations of the scan unit 110 (80) caused by variations in torque applied to the motor 81, and variations in the moving speed of the scan unit 110 (80). Thus, a read image can be prevented from distorting. This embodiment can also prevent transmission of vibrations generated by the motor 81 and belt 82 to the reflecting mirrors 41 to 44, reader screen 30, and the like, which cause distortion of an enlarged/projected image, thereby preventing a distorted image from being scanned by the scan unit 110 (80), and a distorted image from being resultantly obtained.

In the first embodiment, movement of the scan unit 110 (80) is not controlled in accordance with the image data transmission speed. When the data reception speed by an external device lowers, scan stops, the scan unit 110 (80) returns to the home position, and after the data transfer speed recovers, scan restarts. Moreover, a distance is so set as to make the speed constant until the scan unit 110 (80) moves from the home position to the image start position. This also makes the load on the motor 81 almost constant by the time of reaching the image scan start position, and eliminates backlash between the motor 81 and the belt 82.

A vibration factor is eliminated by preventing variations in the physical inertia of the motor 81 and the belt 82 in accelerating/decelerating the motor 81, so that an enlarged/projected image does not distort. The moving speed of the scan unit 110 (80) can always be kept constant, the scan unit can move at a predetermined speed on an enlarged/projected image free from any distort, and image data free from any distortion can always be obtained.

When image data are temporarily stored in the buffer memory 140 from the image processor 130 and sent to the communication unit 150, the buffer memory 140 enables rewriting new image data on image data transmitted from the buffer memory 140 to the host computer 200 via the communication unit 150. This arrangement can ensure an extra data writable capacity of the buffer memory 140 even if the data reception speed of the host computer becomes lower than the image data transmission speed of the communication unit 150. Only when the data writable capacity of the buffer memory 140 becomes full, scan stops, the microfilm reader 100 waits for transmission of data stored in the buffer memory 140, and after the buffer memory 140 attains a satisfactory free area, rescan starts. In this case, the image data writable capacity of the buffer memory 140 may be arbitrarily set within the capacity of the buffer memory 140 depending on the image size to be read. In rescan, image data transmitted to the host computer 200 before scan suspends are discarded, as shown in the flow chart of FIG. 2.

Since image data are sequentially sent to the host computer 200 during scan, the operation from the start of scan by the microfilm reader 100 to reception of image data by the host computer 200 is completed within a shorter time. Since the scan unit 110 (80) always moves at a predetermined speed, image data free from any distortion can be obtained. An image reading apparatus having the mechanism of automatically conveying a microfilm, like the microfilm reader 100 of the first embodiment, can start scanning the next image without waiting for transmission of all image data to the host computer 200, and can scan many images within a short time.

As described above, according to the first embodiment of the present invention, image data are sequentially transmitted to an external device such as a host computer to complete within a short time the operation from the start of image reading by the image reading apparatus to reception of image data by the external device. The data reception state of the external device is monitored, and if the data reception speed of the external device delays from the image data transmission speed, image reading operation suspends and restarts from a home position. Accordingly, image distortion can be prevented.

<Second Embodiment>

The second embodiment of the present invention will be described.

In the first embodiment, when image reading suspends, the scan unit 110 (80) is returned to the home position, scan restarts from the home position. In this manner, effect of acceleration/deceleration of the motor is removed before the scan unit 110 (80) reaches the image scan start position, and an image free from any distortion is read.

However, returning the scan unit 110 (80) to the home position every rescan takes a long time. When a designated desired image reading area is small in an image reading apparatus capable of designating an image reading area, the scan unit 110 (80) inefficiently redundantly moves.

To prevent this, the second embodiment concerns efficient control in an image reading apparatus capable of designating an image reading area.

The basic arrangement of a microfilm reader in the second embodiment is the same as that shown in FIGS. 1, 3, and 4, and a description thereof will be omitted.

Figure 6:
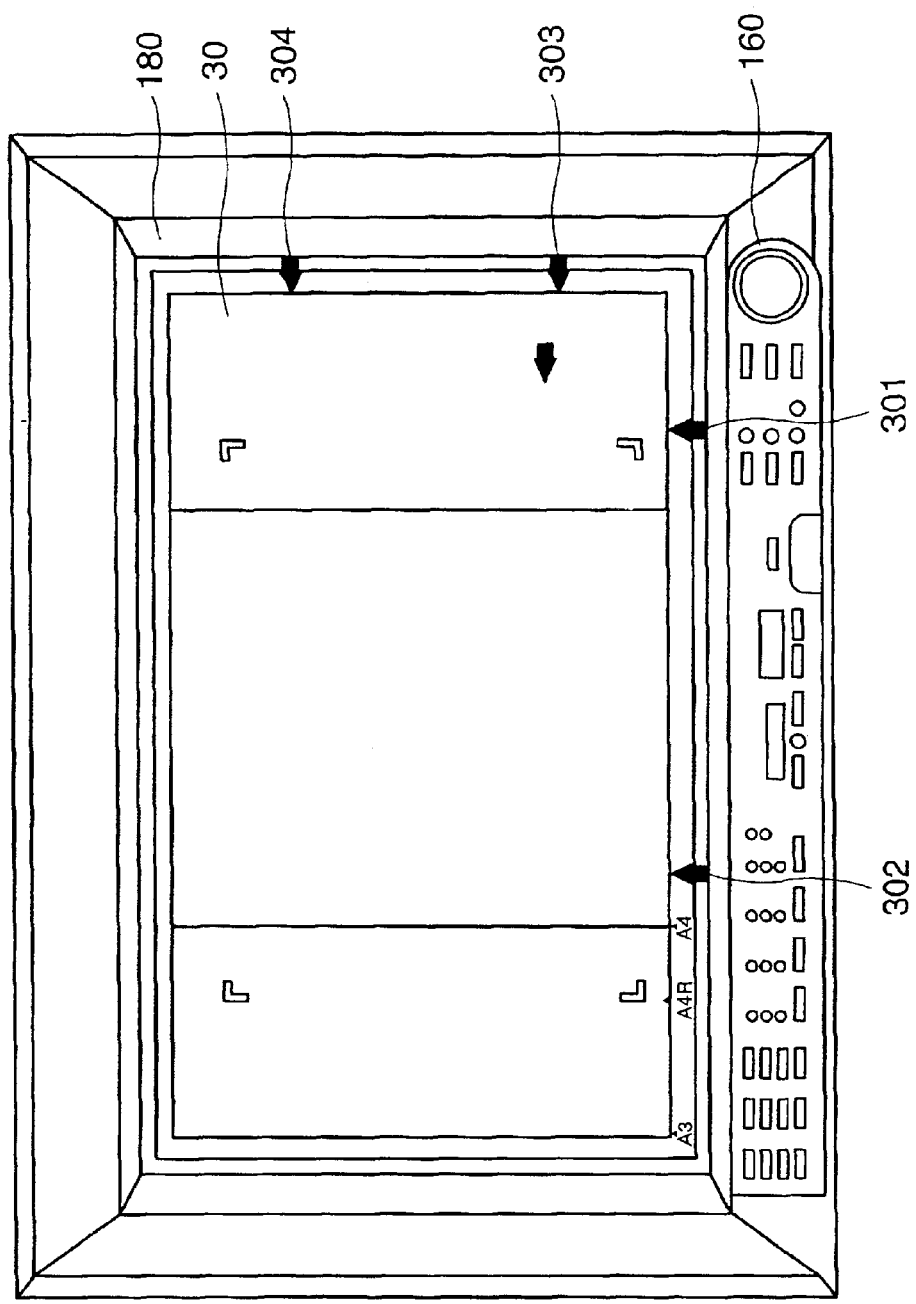
FIG. 6 is a view showing a display panel of the microfilm reader according to the second embodiment of the present invention.
Figure 7:
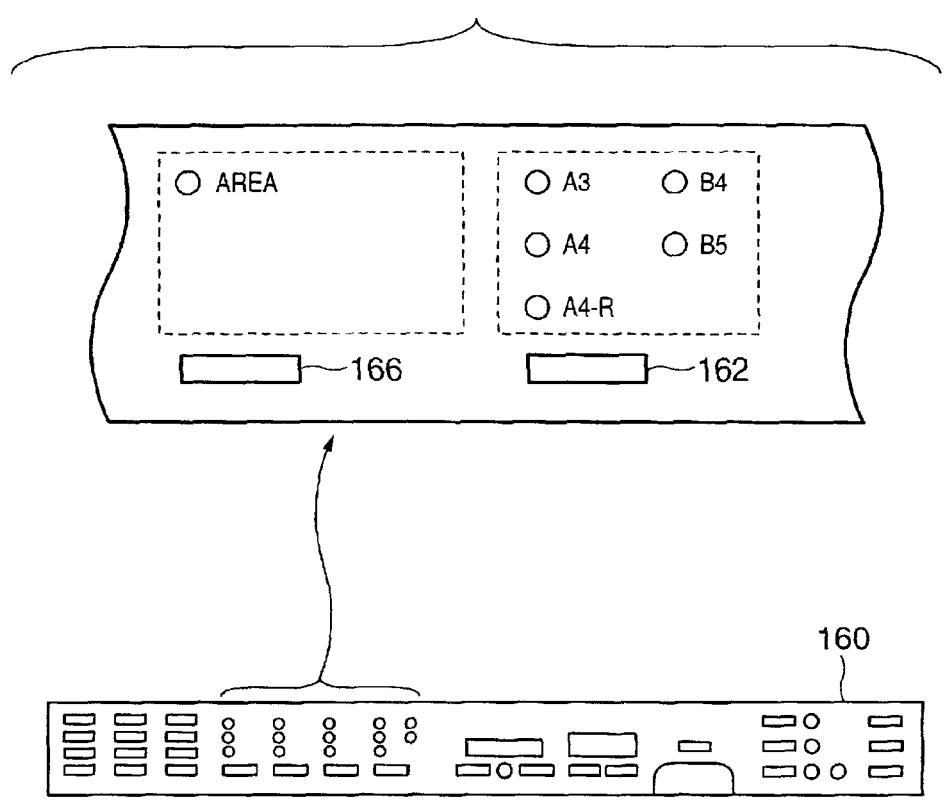
FIG. 7 is a view showing an operation panel of the microfilm reader according to the second embodiment of the present invention.

FIG. 6 is a view showing a full panel including a reader screen 30 according to the second embodiment. FIG. 7 is an enlarged view showing the panel of an operation unit 160 attached to the full panel. In FIG. 6, reference numeral 301 denotes a right area designation cursor for designating the right end of a desired image area; 302, a left area designation cursor for designating the left end; 303, a lower area designation cursor for designating the lower end; and 304, an upper area designation cursor for designating the upper end. These cursors 301 to 304 are attached to the outer frame of the reader screen 30. The right and left area designation cursors 301 and 302 can slide and move horizontally, whereas the lower and upper area designation cursors 303 and 304 can slide and move vertically.

When the user presses an area designation mode button 166 to select an area designation mode on the panel of the operation unit 160 shown in FIG. 7, he/she can use the four cursors 301 to 304 to designate an image area to be read on an image projected and displayed on the reader screen 30.

When the user wants to read at a regular size an image projected and displayed on the reader screen 30, he/she can press a reading size switching button 162 on the operation unit 160 to switch the image size to a desired one. At this time, the reader screen 30 displays the frame of the regular size so as to allow the user to recognize the regular size. These operations can be done not only from the operation unit 160 but from an operation unit 23 or a PC (not shown).

Figure 5:
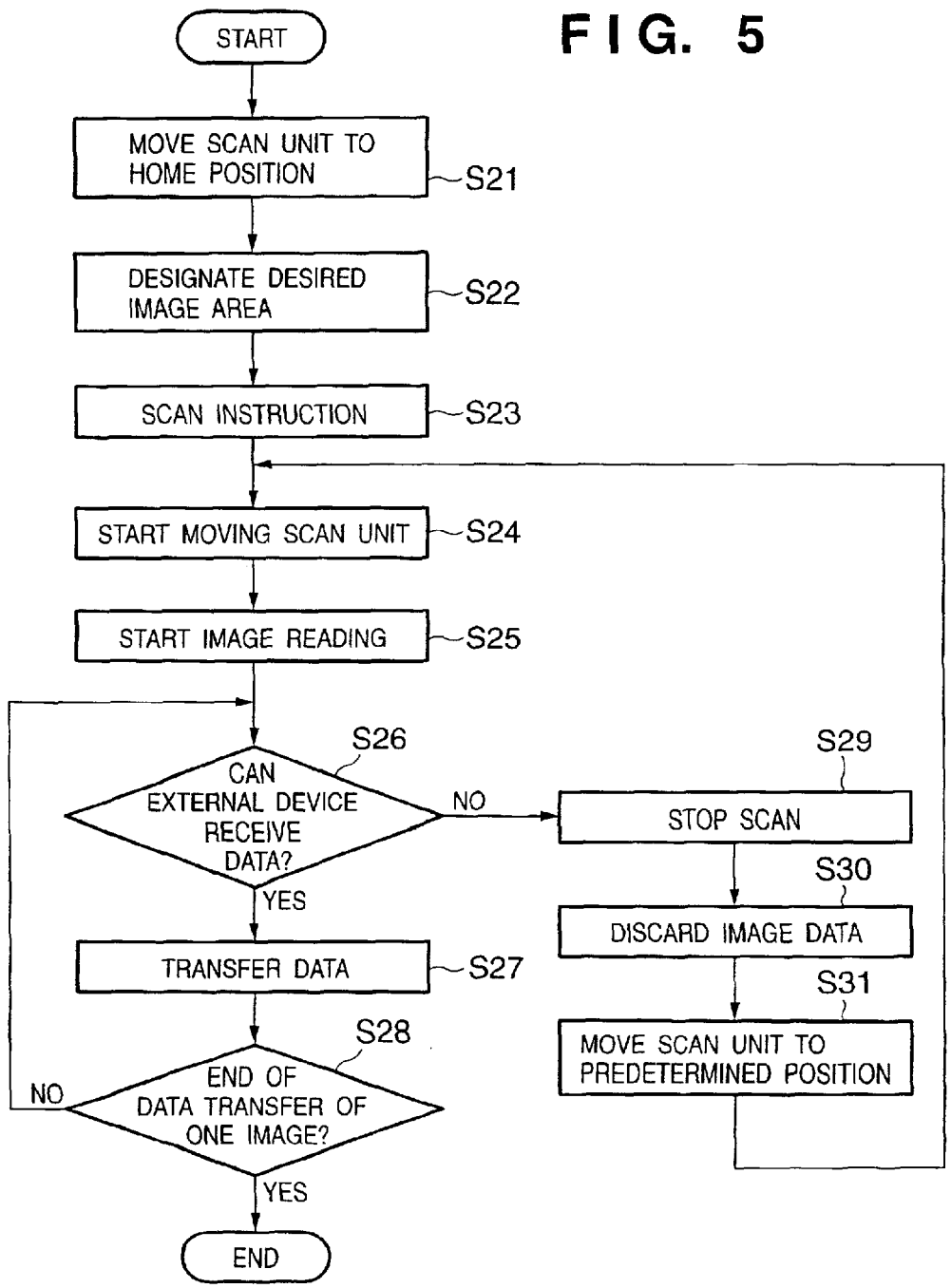
FIG. 5 is a flow chart showing processing operation in a microfilm reader according to a second embodiment of the present invention.
Figure 8:
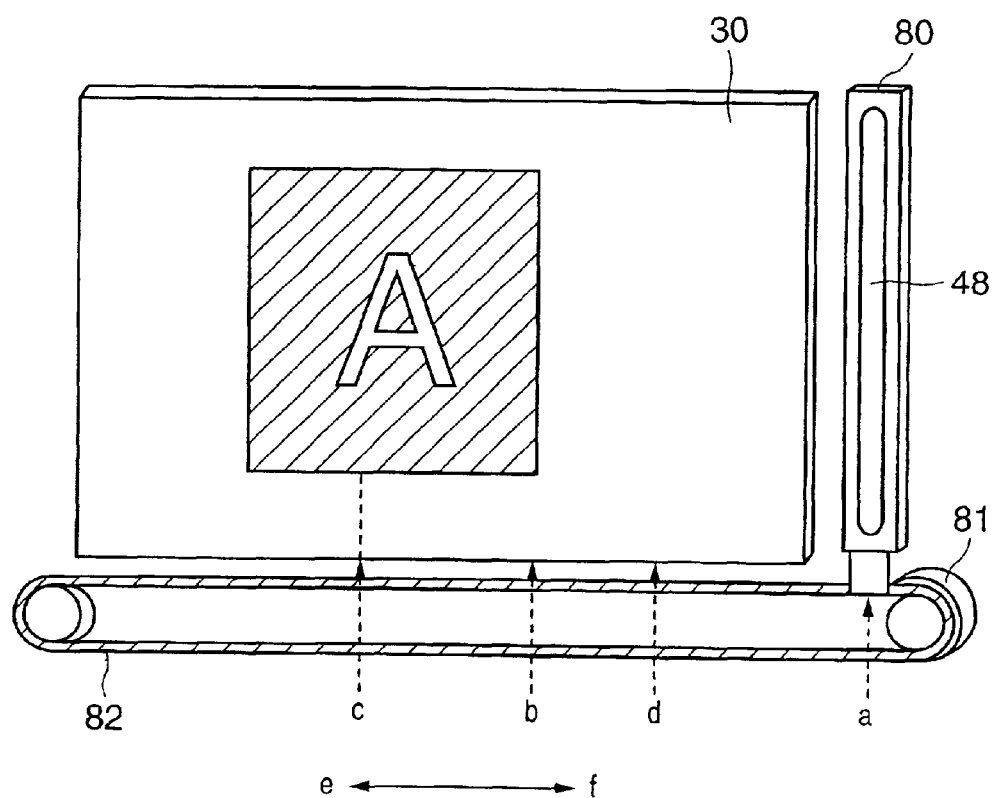
FIG. 8 is a view showing a display of the microfilm reader according to the second embodiment of the present invention.

FIG. 5 is a flow chart showing processing operation in the image reading apparatus (microfilm reader 100) of the second embodiment having the above arrangement. FIG. 8 is a view showing a display and driving mechanism. After the microfilm reader 100 is turned on or reading of a previous image ends, the microfilm reader 100 returns a scan unit 110 to the home position (position a in FIG. 8) (step S21).

A desired image area is selected by using the area designation cursors, or a reading image size is selected by using the reading size selection button (step S22). For example, a hatched image A in FIG. 8 is selected.

If the microfilm reader 100 receives a scan instruction from the operation unit 160 or a host computer 200 (step S23), it is set in the scan mode to start moving the scan unit 110 (80) (step S24). Then, the scan unit moves in the f→e direction. As described above, a distance enough to complete acceleration of the scan unit 110 (80) and make the moving speed constant is ensured between the home position and the image reading start position. The home position is set to make the moving speed of the scan unit 110 constant till the image scan start position of any designated image area to be read. The scan unit 110 (80) comes to the leading edge (position b in FIG. 8) of the selected image area A, i.e., to the image scan start position, and then image scan starts (step S25).

The image reading apparatus checks whether the host computer 200 as an external device at an image data transfer destination can receive transferred data (step S26). As described above, the image reading apparatus can determine the data reception state of the host computer 200 by measuring the time until the host computer 200 sends back an REQ signal.

If the image reading apparatus determines in step S26 that the host computer 200 can receive data, it shifts to step S27 and transfers the read image data to the host computer 200. At this time, while reading the image, the microfilm reader 100 transfers the image data to the host computer 200, ending scan within a shorter time. The image data may be transferred by one line, several lines, or several pixels of an image. This operation continues until data of one image are transferred (step S28).

If the image reading apparatus determines in step S26 that the host computer 200 cannot receive data when the scan unit 110 comes to a position c in FIG. 8, the operation shifts to step S29 and stops scan. All the image data stored in a buffer memory 140 of the microfilm reader 100 are discarded (step S30). In step S30, the microfilm reader 100 may notify the host computer 200 of the suspension and instruct it to discard image data transferred to the host computer 200.

Note that the microfilm reader 100 determines NO in step S26 when the data reception state of the host computer 200 influences the image reading speed of the scan unit 110 (80) and scan cannot be done at a predetermined speed, except when, for example, the buffer memory 140 has a sufficient margin and scan can be done at a predetermined speed by temporarily storing the scanned image and transferring the image data from the buffer memory 140 to the host computer 200 even if the data reception speed of the host computer 200 is lower than the image data transmission speed.

If the image data is discarded in step S30, the process advances to step S31, moves the scan unit 110 in the e→f direction, returns it to a predetermined position d in FIG. 8, and restarts image reading operation. At this time, the microfilm reader 100 may wait for the end of processing in the host computer 200. The microfilm reader 100 may notify the external device by an ACK signal or the like that image reading can restart.

The predetermined position d to which the scan unit 110 (80) returns is a position where the scan unit 110 (80) can move at a predetermined speed after the end of acceleration when the scan unit 110 (80) comes to the leading edge b of the desired image area, and is on the side of the home position a with respect to the position b. The home position a may be set as the predetermined position d depending on the position and size of a desired image area.

Although the predetermined position d changes depending on a designated image area, the acceleration section of the driving unit is almost constant. Hence, the predetermined position d can be easily obtained and set by a CPU or the like. The moving distance of the scan unit becomes shorter by setting the predetermined position d, in comparison with the case wherein the scan unit returns to the home position a. Rescan can be performed within a shorter time.

The second embodiment can accomplish the same effects as those of the first embodiment by, when the data reception speed of the host computer 200 becomes lower than the image data transmission speed, stopping the scan unit 110 (80) and returning it to a predetermined position instead of the home position.

<Third Embodiment>

Figure 9:
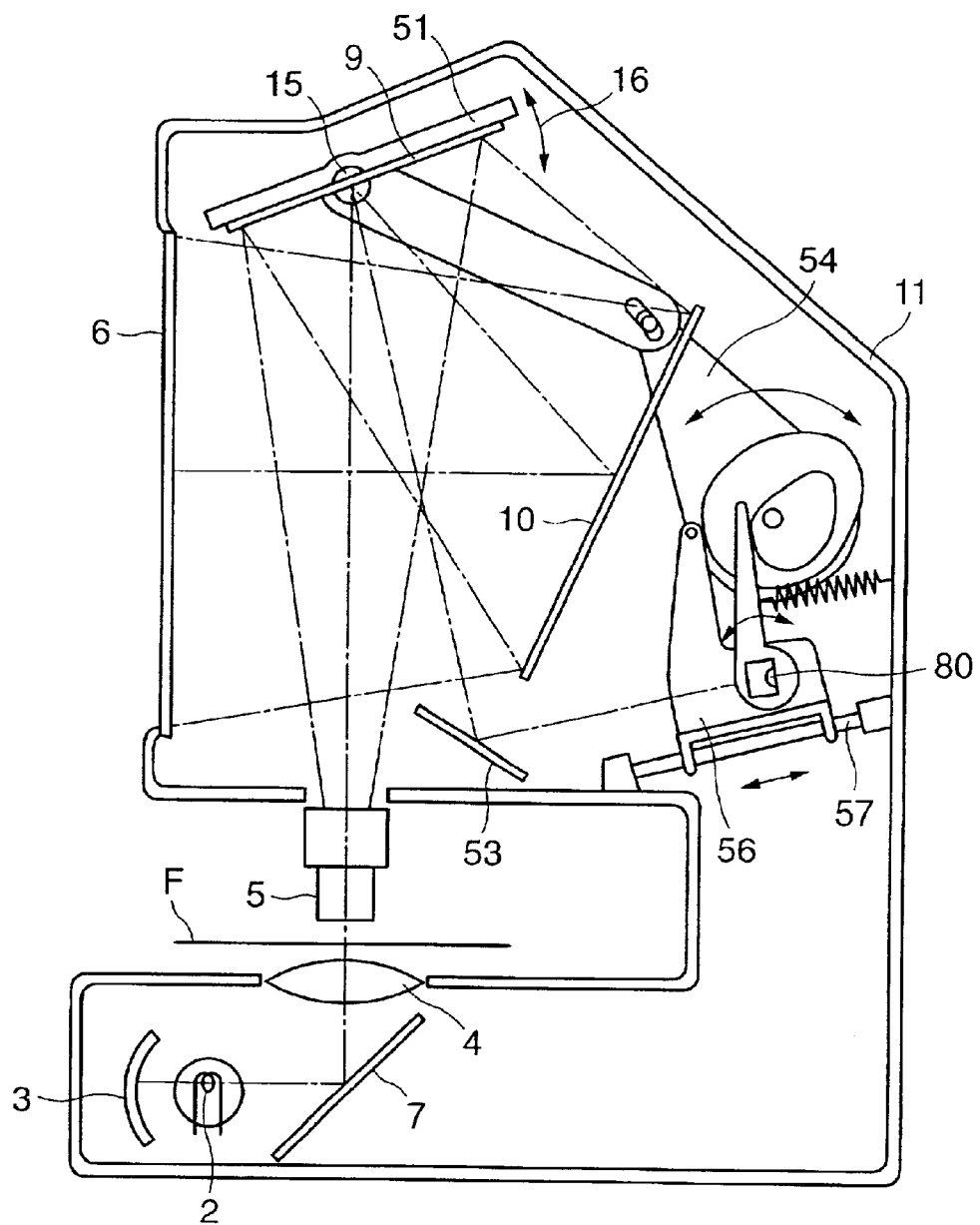
FIG. 9 is a sectional view showing the structure of another microfilm reader.

A microfilm reader different from those of the first and second embodiments will be described as the third embodiment with reference to FIG. 9. In FIG. 9, reference numeral 11 denotes a housing which incorporates a screen projection optical path formed by a ceiling mirror 9 serving as a first reflecting member and a mirror 10 serving as a second reflecting member, and an image reading portion projection optical path formed by the ceiling mirror 9 and a mirror 53 serving as a third reflecting member.

Reference numeral 2 denotes a light source. Illumination light emitted by the light source 2 irradiates a microfilm F held by a pair of glass plates (not shown) via a spherical reflective member 3, a field lens 4, and a mirror 7. The light having passed through the microfilm F is projected on a screen 6 by a projection lens 5 via the screen projection optical path (ceiling mirror 9 and mirror 10) and on a line sensor 80 set behind the reflecting mirror 10 via the image reading portion projection optical path (ceiling mirror 9 and mirror 53).

The ceiling mirror 9 as the first reflecting member is attached with its reflecting surface facing down. A slide table 56 is reciprocally attached to a slide shaft 57. A motor (not shown) reciprocates the slide table 56 to rotate the ceiling mirror 9 about a mirror shaft 15 via a scan lever 54, arm 51, and the like.

The ceiling mirror 9 rotates clockwise in the direction indicated by an arrow 16 from the home position to swing image light. Light from an image end enters the scan unit 80 via the reflecting mirror 53, and image reading starts.

The arrangement having the functions of the second embodiment includes the area designation cursors 301 to 304 for designating a desired image area to be read, as shown in FIG. 6, and the reading size switching button 162 as shown in FIG. 7. Image reading starts when light from the end of a desired area is incident on the line sensor via the reflecting mirror 53.

In this manner, the line sensor 80 can read the microfilm F. The rotation start position of the ceiling mirror 9 is set as a home position to a position where the rotational speed of the ceiling mirror 9 becomes constant till the start of image reading.

The main circuit arrangement of the third embodiment is the same as that in FIG. 1 described in the first and second embodiments.

To stop rotation of the ceiling mirror 9 and execute processing corresponding to the first embodiment when the data reception speed of a host computer becomes lower than the image data transmission speed of the communication unit 150 owing to any cause in the arrangement shown in FIG. 9, the ceiling mirror 9 returns to the home position or to an angle at which the rotational speed of the ceiling mirror 9 becomes satisfactorily constant, and then reading operation starts from the beginning. To execute processing corresponding to the second embodiment, the ceiling mirror 9 returns not to the home position but to an angle at which the rotational speed of the ceiling mirror 9 becomes satisfactorily constant till the image scan start position of the end of a desired image area, and then reading operation restarts. In other words, the rotation start position of the ceiling mirror 9 at which reading operation restarts is set to a position where the rotational speed of the ceiling mirror 9 becomes constant till the start of image scan.

This control can prevent any image distortion caused by vibrations of the motor (not shown), the slide table 56, and the like.

The same effects as those of the first and second embodiments can be obtained even when the scan unit is fixed and an image is scanned by changing the image optical path.

<Other Embodiment>

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 2 and 5 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image reading apparatus comprising:
   an image reading unit adapted to read an original image;
   a transmission unit adapted to sequentially transmit image data of the original image read by said image reading unit to an external device;
   a driver adapted to displace a relative position between the image and said image reading unit;
   a monitoring unit adapted to monitor whether the external device can receive data; and
   a controller adapted to suspend reading operation of said image reading unit when said monitoring unit detects that the external device cannot receive data during execution of reading operation of said image reading unit and control said driver to displace the relative position between the image and said image reading unit to a predetermined position before the suspended position of the image reading operation, and then restart the reading operation of the same image from the predetermined position when said monitoring unit detects that the external device can receive data.

2. The apparatus according to claim 1, wherein said monitoring unit determines based on a signal from the external device whether the external device can receive data.

3. The apparatus according to claim 1, wherein the predetermined position is set in consideration of a distance by which acceleration of said driver ends and a moving speed becomes constant.

4. The apparatus according to claim 1, wherein the predetermined position includes a home position.

5. The apparatus according to claim 1 further comprising
   an area designation unit adapted to designate a desired image area on the predetermined medium, wherein said image reading unit scans and reads the image area of the predetermined medium designated by said area designation unit.

6. The apparatus according to claim 5, wherein the predetermined position is set to a position before an image scan start position of the desired image area designated by said area designation unit in consideration of a distance by which acceleration of said driver ends and a moving speed becomes constant until the relative position between the image and said image reading unit reaches the image start position of the desired image area.

7. The apparatus according to claim 6, wherein the predetermined position is changed depending on the image scan start position of the desired image area designated by said area designation unit.

8. The apparatus according to claim 5, wherein said driver moves said image reading unit while said image reading unit scans and reads the image on the predetermined medium.

9. The apparatus according to claim 5, wherein the predetermined medium is illuminated to input optical information to said image reading unit, said image reading unit is fixed, and said driver changes an optical path of the optical information, thereby causing said image reading unit to scan and read the desired image area of the predetermined medium.

10. The apparatus according to claim 1, wherein said driver moves said image reading unit while said image reading unit scans and reads the image on the predetermined medium.

11. The apparatus according to claim 1, wherein the predetermined medium is illuminated to input optical information to said image reading unit, said image reading unit is fixed, and said driver changes an optical path of the optical information, thereby causing said image reading unit to scan and read the image on the predetermined medium.

12. The apparatus according to claim 1 further comprising notification unit adapted to notify the external device of a suspension notification when reading operation of said image reading unit suspends.

13. The apparatus according to claim 12, wherein said notification unit notifies the external device of the suspension notification and a discard instruction of discarding image data which have been transmitted by image reading operation.

14. The apparatus according to claim 1 further comprising
   a notification unit adapted to notify the external device of a restart enable notification when reading operation of said image unit can restart.

15. The apparatus according to claim 1, wherein the predetermined medium includes a microfilm.

16. The apparatus according to claim 15 further comprises a display on which an image on the microfilm is projected, and said image reading unit scans and reads the image projected on said display.

17. An image reading apparatus comprising:
   an image reading unit adapted to read an original image;
   a driver adapted to displace a relative position between the original image and said image reading unit;
   memory adapted to temporarily store image data of the original image read by said image reading unit;
   a transmission unit adapted to sequentially transmit the image data stored in said memory to an external device;
   a detection unit adapted to detect an available capacity of said memory; and
   a controller adapted to suspend reading operation of said image reading unit when said detection unit detects that the available capacity of said memory decreases to less than a predetermined capacity during execution of the reading operation of said image reading unit and control said driver to displace the relative position between the original image and said image reading unit to a predetermined position before the suspended position of the image reading operation,
   and then restart reading operation of the same original image from the predetermined position when said detection unit detects that the available capacity of said memory increases.

18. The apparatus according to claim 17, wherein said memory can successively store image data in an area where image data which have been transmitted to the external device are stored.

19. The apparatus according to claim 17 further comprising data discard unit adapted to discard image data which have been stored in said memory by reading operation when the reading operation of said image reading unit suspends.

20. An image reading method of reading an original image by displacing a relative position between the original image and an image reading unit by a driver, and sequentially transmitting image data of the original image read by the image reading unit to an external device, comprising:
the monitoring step of monitoring whether the external device receive data;
the displacement step of suspending reading operation of said image reading unit when said monitoring step detects that the external device cannot receive data during execution of reading operation of said image reading unit and displacing the relative position between the original image and the image reading unit to a predetermined position before the suspended position of the image reading operation; and
the reading restart step of restarting the reading operation of the same image from the predetermined position displaced in the displacement step when said monitoring step detects that the external device can receive data.

21. The method according to claim 20, wherein in the monitoring step, whether the external device can receive data is determined based on a signal from the external device.

22. The method according to claim 20, wherein die predetermined position is set in consideration of a distance by which acceleration of the driver ends and a moving speed becomes constant.

23. The method according to claim 20, wherein the predetermined position includes a home position.

24. The method according to claim 20, further comprising the designation step of designating desired image area of the predetermined medium, wherein the designated desired image area is read by the image reading unit, and the predetermined position is set to a position before an image scan start position of the desired image area designated in the designation step in consideration of a distance by which acceleration of the driver ends and a moving speed becomes constant until the relative position between the image and the image reading unit reaches the image scan start position of the desired image area.

25. The method according to claim 24, wherein the predetermined position is changed depending on the image scan start position of the desired image area designated in the designation step.

26. The method according to claim 20 further comprising the notification step of notifying the external device of a suspension notification when reading operation of the image reading unit suspends.

27. The method according to claim 26, wherein, in the notification step, a discard instruction of discarding image data transmitted by image reading operation is also notified to the external device.

28. The method according to claim 20 further comprising the notification step of notifying the external device of a restart enable notification when reading operation of the image reading unit can restart.

29. The method according to claim 20, wherein the predetermined medium includes a microfilm.

30. The method according to claim 29 further comprising the display step of projecting an image of the microfilm, wherein the image reading unit scans and reads the image projected in the display step.

31. An image reading method of reading an original image by displacing a relative position between the original image and an image reading unit by a driver, comprising:
the storage step of temporarily storing image data of the original image read by the image reading unit in memory;
the transmission steps of sequentially transmitting the image data stored in the memory to an external device;
the detection step of detecting an available capacity of e memory;
the suspension step of suspending reading operation of the image reading unit when said detection step detects that the available capacity of the memory decreases to less than a predetermined capacity during execution of reading operation of said image reading unit;
the displacement step of displacing the relative position between the original image and the image reading unit to a predetermined position before the suspended position of the image reading operation; and
the reading restart step of restarting the reading operation of the same original image from the predetermined position displaced in the displacement step when said detection step detects that the available capacity of said memory increases.

32. The method according to claim 31, wherein in the storage step, image data can be successively stored in an area where image data which have been transmitted to the external device are stored.

33. The method according to claim 31 further comprising the data discard step of discarding image data stored in the storage step by reading operation when the reading operation of the image reading unit suspends.

34. A computer program product comprising:
a computer usable medium having computer readable program code means embodied in said medium and reading an original image by displacing a relative position between the original image and an image reading unit by a driver, and sequentially transmitting image data of the original image read by the image reading unit to an external device, said product including:
first computer readable program code means for monitoring whether the external device can receive data;
second computer readable program code means for suspending reading operation of said image reading unit when it is detected that the external device cannot receive data during execution of the reading operation of said image reading unit and displacing the relative position between the image and the image reading unit to a predetermined position before the suspended position of the image reading operation; and
third computer readable program code means for restarting the reading operation of the same image from the predetermined position when it is detected that the external device can receive data.

35. A computer program product comprising:
a computer usable medium having computer readable program de means embodied in said medium for reading an original image by displacing a relative position between the original image and an image reading unit by a driver, said product including:

first computer readable program code means for temporarily storing image data of the original image read by the image reading unit in memory;

second computer readable program code means for sequentially transmitting the image data stored in the memory to an external device;

third computer readable program code means for detecting an available capacity of the memory;

fourth computer readable program code means for suspending reading operation of the image reading unit when it is detected that the available capacity of the memory decreases to less than a predetermined capacity during execution of reading operation of said image reading unit;

filth computer readable program code means for displacing the relative position between the original image and the image reading unit to a predetermined position before the suspended position of the image reading operation; and sixth computer readable program code means for restarting the reading operation of the same original image from the predetermined position when it is detected that the available capacity of said memory increases.

* * * * *

UNITED STATES PATENT AND TRADEMARK OFFICE
CERTIFICATE OF CORRECTION

PATENT NO. : 6,934,058 B2
DATED : August 23, 2005
INVENTOR(S) : Kageyama et al.

It is certified that error appears in the above-identified patent and that said Letters Patent is hereby corrected as shown below:

Column 13,
Lines 35-36, delete "wherein die predetermined" and insert -- wherein the predetermined --.

Column 14,
Lines 15-16, delete "an available capacity of e memory;" and insert -- an available capacity of the memory; --.
Line 66, delete "program de means" and insert -- program code means --.

Column 16,
Line 3, delete "filth computer readable program code mean" and insert -- fifth computer readable program code means --.

Signed and Sealed this

Twenty-eighth Day of February, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,934,058 B2 | Page 1 of 1 |
| APPLICATION NO. | : 09/884614 | |
| DATED | : August 23, 2005 | |
| INVENTOR(S) | : Kageyama et al. | |

It is certified that error appears in the above-identified patent and that said Letters Patent is hereby corrected as shown below:

On the Cover Page at item [73], please delete Assignee name "Canon Kabushiki Kaisha" and insert therefore --Canon Denshi Kabushiki Kaisha--

Signed and Sealed this

Thirtieth Day of January, 2007

JON W. DUDAS
*Director of the United States Patent and Trademark Office*